3,272,776
PREPARATION OF POLY(ESTER-AMIDES)
John R. Caldwell, Kingsport, Tenn., assignor to Eastman Kodak Company, Rochester, N.Y., a corporation of New Jersey
No Drawing. Filed Apr. 5, 1962, Ser. No. 185,206
17 Claims. (Cl. 260—47)

This invention relates to the production of linear poly(ester-amides) having film-forming and fiber-forming properties. More particularly the invention relates to a new and improved process for the production of linear poly(ester-amides) of aminoalcohols. Still more particularly the invention relates to a continuous process for the production of such poly(ester-amides).

It is known from U.S. Patent 2,396,248 to produce poly(ester-amides) through the reaction of the aminoalcohols with free dicarboxylic acids. However, operating in this manner presents a number of severe obstacles which have not been heretofore successfully dealt with in a practical manner. It is well known, for example, that the acids used for the production of polymers of the type in question must be extremely pure since the presence of even minute proportions of any impurity which finds its way into the polymer reduces the melting point and adversely affects the viscosity of the polymer product. In the case of high melting, water-insoluble acids, such as terephthalic acid, it is extremely difficult and expensive to obtain the free acid in the state of purity required in the production of a high molecular weight fiber-forming type of polymer. The standard usually set for this degree of purity is in the range of 1 part of impurity to 1,000 parts of acid to 1 part of impurity per 10,000 parts of acid. Purification usually involves the preparation of the sodium salt and regeneration of the organic acid by the addition of a mineral acid. It is thus seen that two equivalents of alkali and mineral acid are consumed when producing pure terephthalic acid by the conventional method. The sodium salt of the acid cannot be used in the polymerization reaction because it does not react with the aminoalcohol. Furthermore, even when an acid of the required purity is obtained other difficulties are encountered. For example, when reacting a free carboxylic acid and aminoalcohol a mixture of the two reactants forms a hard granular mass that is practically impossible to pump or convey by other means. This practically precludes the carrying out of the reaction in a continuous manner. In addition, the mixture is insoluble in water and hence cannot be handled as a solution. Furthermore the individual reactants cannot be employed as solutions because the acid compound is insoluble in water.

This invention has as an object to provide a practical and easily operated process for the production of linear poly(ester-amides) of aminoalcohols of the film and fiber-forming variety.

Another object is to provide a continuous process for the formation of such linear poly(ester-amides).

A further object is to provide an improved process for the production of such polymers which does not involve the use of free carboxylic acids and avoids the reaction and handling difficulties inherent in prior art processes.

A still further object is to provide a simple, easily operated practical process for the production of linear poly(ester-amides) of aminoalcohols of the film and fiber-forming type.

Other objects will appear hereinafter.

These objects are accomplished by the following invention which, in a preferred embodiment, involves the reaction between ammonium salts of dicarboxylic acids with aminoalcohols to form high viscosity polymers having excellent color and good film and fiber-forming and physical properties. In accordance with the invention the first step is the preparation of the ammonium salt of a dicarboxylic acid by known recrystallization processes. The ammonium salt thus obtained is then dissolved in water to a concentration of 10–30 percent, for example, and the solution can then be fed into a continuous or batch reactor, as desired, where it is brought into contact with the aminoalcohol which also may be present as an aqueous solution of 10–50 percent concentration. Alternatively, both the ammonium salt and the aminoalcohol may be dissolved simultaneously in substantially equal molar ratios in water to form an aqueous solution of the two components. It is one of the important features of the invention that this aqueous solution of the reactants may be pumped or otherwise transferred to a desired reaction zone by conventional means and methods.

After the two solutions of the reacting components (or the single solution containing both reactants) are fed to the reactor heat is applied, first to remove the water introduced by the solution and second to remove the water formed in the polymerization reaction itself. Initially a temperature of 100–200° C. is employed to remove the water introduced from the solution. As the reaction starts the temperature employed may range from 200° C. to 300° C. and preferably from 240° C. to 280° C. and the pressure may be approximately atmospheric. During the heating period ammonia is evolved and free dicarboxylic acid is formed prior to any reaction of the acid component with the aminoalcohol. In other words, ammonia is eliminated from the reaction mixture along with the water. At temperatures above 200° C. the polymerization reaction starts and amide linkages and ester linkages are formed thus building up the polymer chain. The reaction is continued at reduced pressure and at the elevated temperature within the above indicated range until the desired polymer viscosity is obtained as indicated by removing samples from the reaction batch from time to time and subjecting them to viscosity determinations by well known methods. Advantageously, a pressure of less than about 5 mm. of Hg and preferably less than .55 mm. may be employed. The reaction is continued until the desired intrinsic viscosity of the polymer is obtained, in general it being desired to produce a polymer having an intrinsic viscosity of at least approximately 0.5 in order that it may have the required film and fiber-forming properties.

The intrinsic viscosity may be defined as $$I.V. = \frac{\log_e Nr}{C}$$

in which $Nr$ is the viscosity of a dilute solution of the polymer in 60 parts by weight of phenol and 40 parts by weight of tetrachlorethane divided by the viscosity of the mixed solvent in the same units and at the same temperature, and $C$ is the concentration in grams of polymer per 100 cc. of solution.

While the reaction may be carried out without a catalyst, it is preferred to employ a catalyst in order to increase the reaction rate and this should be introduced in the desired amount simultaneously with introduction of the reactants. Preferred catalysts are titanium tetraalkoxides. Other useful catalysts for the reaction include alkyltin oxides and lead oxides. The preparation and use of such catalysts for the reaction here involved is well known in the art and need not be discussed in detail.

The aminoalcohols employed in the process of the present invention have the general structures indicated below:

(1) 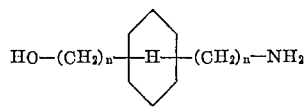

(2) 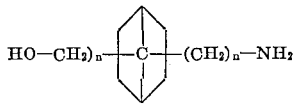

(3) 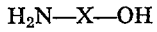

wherein $n=0$ to 4 and X is a straight or branched chain alkylene group containing 4 or more carbon atoms.

Aminoalcohols which have been found of especial value in the process of the invention are the following:

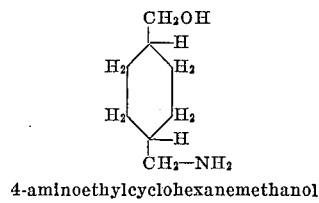
4-aminoethylcyclohexanemethanol

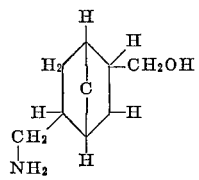
5-aminomethylbicycloheptane[2,2,1]-2-methanol

Other aminoalcohols which find usefulness in the invention are: 4-aminocyclohexanemethanol; 4 - aminomethylcyclohexanol; 5 - aminobicycloheptane[2,2,1]-2-methanol; 4-aminobutanol-1; 3-amino-2,2-dimethylpropanol-1; 4-aminobutanol-1; and 3-aminomethylcyclohexanemethanol.

Suitable aliphatic acids include those that contain four or more carbon atoms between the carboxyl groups. Examples of suitable aromatic dicarboxylic acids are: terephthalic; isophthalic; 4,4' - sulfonyldibenzoic; 4,4'-methylenedibenzoic; 4,4'-oxydibenzoic; 1,2-di(carboxyphenoxy)ethane and 1,1-di(4-carboxyphenyl)ethane.

Acids that contain an aromatic ring and ether groups are suitable as represented by p-phenylenedioxydiacetic acid,

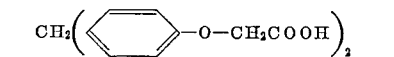
Methylenebis(p-phenyleneoxy)diacetic acid

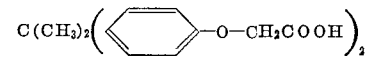
Isopropylidenebis(p-phenyleneoxy)diacetic acid

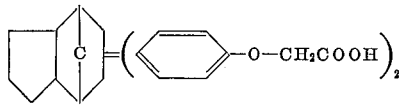
Hexahydro-4,7-methanoindan-5-ylidenebis(p-phenyleneoxy)-diacetic acid

Cis- and trans-1,4-cyclohexanedicarboxylic acid can also be used.

The above acids may be prepared according to the general method disclosed in Ber. 40, 2790 (1907).

Copolymers can also be prepared in accordance with the invention in which from 95–75 mole percent of an aromatic dicarboxylic acid such as terephthalic acid is used in combination with 25–5 mole percent of another dicarboxylic acid, preferably an aliphatic dicarboxylic acid containing four or more carbon atoms between the carboxyl groups, such as adipic, suberic and sebacic acids.

The reaction by which the poly(ester-amides) of aminoalcohols are produced in accordance with the invention may be represented by the following equation:

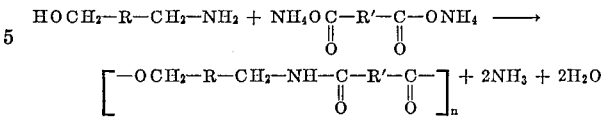

wherein R is derived from the aminoalcohol, R' is derived from the acid and $n$ is greater than about 30.

In the following examples and description there are set forth several of the preferred embodiments of the invention but they are included merely for purposes of illustration and not as a limitation thereof.

*Example 1.—Preparation of diammonium terephthalate*

The terephthalic acid used in preparing this compound was made by the air-oxidation of p-xylene in acetic acid solution, with a cobalt catalyst. Acetaldehyde was introduced during the oxidation in order to keep the catalyst active. Terephthalic acid made by this process contains from 0.4–5.0 percent p-toluic acid. It also contains appreciable amounts of cobalt from this catalyst and iron from the equipment. It is yellow or brown in color.

Fifty g. of crude terephthalic acid was dissolved in a mixture of 500 cc. water and 100 g. ammonium hydroxide. Three g. of Darco decolorizing carbon was added and the mixture was stirred for 15 minutes at 60–70° C. The carbon was removed by filtration and 600 cc. of isopropyl alcohol was added to the filtrate. A precipitate of ammonium terephthalate was formed. This was dissolved by heating the mixture to boiling. The solution was then allowed to cool slowly. The ammonium terephthalate separated out as large crystals. The solution was further cooled to 15° C. and the crystals were filtered. The yield was 23 g. of salt. More product can be recovered by adding more isopropyl alcohol. The ammonium terephthalate was used for the production of polymers as described below.

*Example 2.—Preparation of diammonium terephthalate*

In this process the ammonium salt is crystallized from hot water by cooling. Isopropyl alcohol is not used as a precipitant.

Ten g. of crude terephthalic acid, 16 cc. of ammonium hydroxide, 0.5 g. of Darco decolorizing carbon and 54 cc. of water were placed in a pressure vessel and agitated at 90–100° C. until the acid dissolved. The solution was then filtered at 90° C. under pressure to prevent loss of ammonia. The filtrate was cooled to 15° C. and the crystals were filtered off. A yield of 6.5 g. ammonium terephthalate was obtained. This salt gave high viscosity polymers having a good color. A greater recovery can obtained by using less water and working at higher temperatures.

*Example 3.—Preparation of polymer from 4-aminoethylcyclohexanemethanol*

Ten g. (0.05 mole) of diammonium terephthalate (from Example 1), 7.15 g. (0.05 mole) of 4-aminomethylcyclohexanemethanol and 2 cc. of water were placed in a vessel equipped with a stirrer, an inlet for purified nitrogen and a distillation column. The mixture was stirred at 150° C. for 5 minutes. Titanium tetraisopropoxide (0.02 g.) was added and the temperature was raised to 260° C. The melt was stirred at this temperature for 15 minutes. A vacuum of 0.05 mm. was applied and stirring was continued for 1 hour. A high viscosity, almost colorless melt was obtained.

The polymer had an inherent viscosity of 0.48 as measured in a solvent consisting of 60 phenol-40 tetrachloroethane. A sample of the polymer was crystallized by boiling in methyl alcohol for 10–15 minutes. It melted at 300–310° C. This polymer is valuable for the production of fibers, films, and molded objects.

Example 4.—Preparation of polymer from 4-aminomethylcyclohexanemethanol

Ten g. of diammonium terephthalate (from Example 2), 7.15 g. of 4-aminomethylcyclohexanemethanol and 2 cc. of water were placed in a vessel as described in Example 3. The mixture was stirred at 150° C. for 5 minutes and 0.02 g. titanium tetrabutoxide was added. The temperature was raised to 260° C. and stirring was continued for 15 minutes. A vacuum of 0.02 mm. was applied and the melt was stirred for 15–20 minutes. It was then removed from the vessel under nitrogen and cooled. This prepolymer had an inherent viscosity of about 0.2–0.30. It was ground to a particle size of about 0.03 in. and boiled in methyl alcohol to induce crystallization. The polymer was then placed in a vessel and a vacuum of 0.1 mm. was applied. The temperature was raised to 200° C. during a period of 1 hour. The temperature was then raised to 260° C. during a period of 30 minutes and heating was continued at this temperature for 2 hours. The polymer was practically colorless and had an inherent viscosity of 1.5. It melted at 300–310° C.

Example 5.—Preparation of polymer from trans-cyclohexane-1,4-dicarboxylic acid and 4-aminomethylcyclohexanemethanol Using the general procedure described in Example 4, a polymer was made from the diammonium salt of trans-cyclohexane-1,4-dicarboxylic acid and 4-aminomethylcyclohexanemethanol. It melted at 270–280° C. This polymer is soluble in a 50–50 mixture of methylene chloride and methanol. It is valuable for the production of fibers, films and molded objects.

Example 6.—Preparation of polymer from diammonium terephthalate and 4-aminomethylcyclohexanol Using the general procedure described in Example 3, a polymer was made from diammonium terephthalate and 4-aminomethylcyclohexanol. It was useful for the production of molded objects and fibers.

Example 7.—Preparation of polymer from diammonium terephthalate and 4-aminocyclohexanemethanol Using the generally procedure described in Example 4, a polymer was made from diammonium terephthalate and 4-aminocyclohexanemethanol. It was useful for the production of fibers, films and molded objects.

Example 8.—Preparation of polymer from diammonium salt of 4,4'-sulfonyldibenzoic acid and 4-aminomethylcyclohexanemethanol Using the general procedure described in Example 4, a polymer was made from the diammonium salt of 4,4'-sulfonyldibenzoic acid and 4-aminomethylcyclohexanemethanol. It was useful for the production of fibers, films, and molded objects.

Example 9.—Continuous preparation of polymer

An aqueous solution of diammonium terephthalate and an aqueous solution of 4-aminomethylcyclohexanemethanol were pumped simultaneously into the top of a heated column that was equipped with baffle plates and a screw conveyor. Water vapor was removed from the column near the top. Polymer formation took place as the reactants passed downward through the column until a viscosity of about 0.2–0.3 was obtained. The prepolymer was then conveyed to another column where vacuum was applied and a viscosity of 1.0 to 1.6 was obtained. The finished polymer was continually extruded from the second stage reactor. Titanium alkoxide catalyst can be used.

Example 10.—Continuous preparation of polymer

An aqueous solution containing 1 mole of 4-aminomethylcyclohexanemethanol, 1 mole of trans-cyclohexane-1,4-dicarboxylic acid and 1–2 moles of ammonia was prepared. The solution was pumped into a continuous polymerizer as described in Example 9. High viscosity polymer was withdrawn at the bottom. Titanium alkoxide catalyst can be used.

Example 11.—Continuous preparation of copolymer

An aqueous solution containing 1 mole of 4-aminomethylcyclohexanemethanol, 0.75 mole of ammonium terephthalate and 0.25 mole of ammonium sebacate was prepared. The solution was pumped into a continuous polymerizer as described in Example 9. High viscosity polymer was withdrawn at the bottom. Titanium alkoxide catalyst can be used.

Example 12.—Continuous preparation of polymer

Using the procedure described in Example 9, a polymer was made from equal molecular proportions of diammonium terephthalate and 4-aminobutanol.

From the above discussion and examples it will be seen that the process of the invention may be operated with equal facility in a batch-wise or continuous manner. In view of the novel and specific features of being able to operate in aqueous solutions the process lends itself readily to continuous operation.

It will be evident to those skilled in the art that by the present invention there is provided a simple, readily workable and practical process for the production of poly(ester-amides) of aminoalcohols. In view of the fact that the teachings of the prior art have heretofore indicated that in order to obtain a technically useful poly(ester-amide) it is necessary to employ carboxylic acids which are notoriously difficult to purify to the extent necessary in producing polymers, it is surprising and unexpected to find that the ammonium salts of dicarboxylic acids readily react with aminoalcohols to form high viscosity polymers of excellent color and having the desired viscosity characteristics and physical properties required for film and fiber formation. One of the outstanding advantages of the present invention is the fact that the reactants are water soluble and can be readily pumped or conveyed by other means to a reaction zone where polymer formation takes place, something which was impossible by employing the technique heretofore known for the production of poly(ester-amides) of aminoalcohols.

Although the invention has been described in considerable detail with particular reference to certain preferred embodiments thereof, variations and modifications can be effected within the spirit and scope of the invention as described hereinabove, and as defined in the appended claims.

I claim:

1. The process of producing a linear high molecular weight film and fiber forming poly(ester-amide) which comprises reacting in an aqueous solution a diammonium salt of a dicarboxylic acid with an aminoalcohol at a temperature within the range of 100–200° C., said diammonium salt and said aminoalcohol being present in substantially equal molecular proportions, continuing the reaction within this temperature range until the water from the solution and the water formed in the reaction are removed, thereafter continuing the reaction at a temperature within the range of 200–300° C. and continuing the reaction at reduced pressure below about 5 mm. of Hg pressure whereby the poly(ester-amide) is formed.

2. The process of producing a linear high molecular weight film and fiber-forming poly(ester-amide) which comprises reacting in an aqueous solution a diammonium salt of a dicarboxylic acid with an aminoalcohol at a temperature within the range of 100–200° C., continuing the reaction within this temperature range until the water from the solution and the water formed in the reaction and the evolved ammonia are removed, thereafter continuing the reaction at a temperature within the range of 200–300° C., and at a reduced pressure of less than about 5 mm. until a poly(ester-amide) having an inherent viscosity of at least about .5 is formed.

3. A process of claim 2 in which the diammonium salt is a salt of a dicarboxylic acid selected from the group consisting of aliphatic dicarboxylic acids containing at least four carbon atoms between the carboxyl groups, aromatic dicarboxylic acids, alkylidenebis(p-phenyleneoxy) diacetic acids, para-phenylenedioxydiacetic acid and 1,4-cyclohexane dicarboxylic acid.

4. A process of claim 2 in which the diammonium salt is a salt of a dicarboxylic acid selected from the group consisting of aliphatic dicarboxylic acids containing at least four carbon atoms between the carboxyl groups, aromatic dicarboxylic acids, alkylidenebis(p-phenyleneoxy) diacetic acids, para-phenylenedioxydiacetic acid and 1,4-cyclohexane dicarboxylic acid and the aminoalcohol is an alcohol selected from the group consisting of compounds having the following structural formulae:

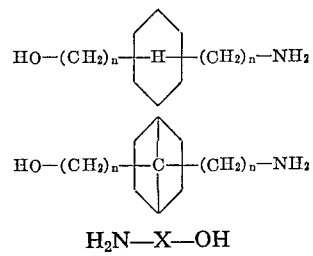

H₂N—X—OH wherein $n=0$ to 4 and X is a straight or branched chain alkylene group containing 4 or more carbon atoms.

5. The process of claim 2 in which the dicarboxylic acid is terephthalic and the aminoalcohol is 4-aminomethylcyclohexanemethanol.

6. The process of claim 2 in which the dicarboxylic acid is trans-1,4-cyclohexanedicarboxylic acid and the aminoalcohol is 4-aminomethylcyclohexanemethanol.

7. The process of producing a linear high molecular weight film and fiber-forming poly(ester-amide) which comprises reacting in an aqueous solution a diammonium salt of a dicarboxylic acid with an aminoalcohol at a temperature within the range of 100–200° C., continuing the reaction within this temperature range until the water from the solution and the water formed in the reaction and the evolved ammonia are removed, thereafter continuing the reaction at a temperature within the range of 240–280° C. and at a reduced pressure of less than about .5 mm. until a poly(ester-amide) having an inherent viscosity of at least about .5 is formed.

8. A process of claim 7 in which the diammonium salt is a salt of a dicarboxylic acid selected from the group consisting of aliphatic dicarboxylic acids containing at least four carbon atoms between the carboxyl groups, aromatic dicarboxylic acids, alkylidenebis(p-phenyleneoxy) diacetic acid, para-phenylenedioxydiacetic acid and 1,4-cyclohexanedicarboxylic acid.

9. A process of claim 7 in which the diammonium salt is a salt of a dicarboxylic acid selected from the group consisting of aliphatic dicarboxylic acids containing at least four carbon atoms between the carboxyl groups, aromatic dicarboxylic acids, alkylidenebis(p-phenyleneoxy) diacetic acids, para-phenylenedioxydiacetic acid and 1,4-cyclohexanedicarboxylic acid and the aminoalcohol is an alcohol selected from the group consisting of compounds having the following structural formulae:

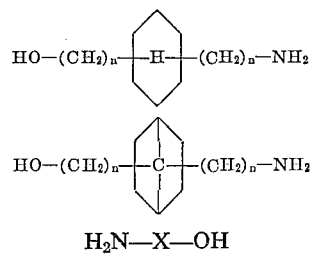

H₂N—X—OH wherein $n=0$ to 4 and X is a straight or branched chain alkylene group containing 4 or more carbon atoms.

10. The process of claim 7 in which the dicarboxylic acid is terephthalic and the aminoalcohol is 4-aminomethylcyclohexanemethanol.

11. The process of claim 7 in which the dicarboxylic acid is trans-1,4-cyclohexanedicarboxylic acid.

12. The process of producing a linear high molecular weight film and fiber-forming poly(ester-amide) which comprises continuously introducing into a reaction zone an aqueous solution of a diammonium salt of a dicarboxylic acid, simultaneously introducing into said reaction zone an aqueous solution of a bifunctional aminoalcohol, said diammonium salt and said aminoalcohol being present in substantially equal molecular proportions, subjecting the reaction mixture to a temperature within the range of 100–200° C., continuing the reaction within this temperature range until the water from the solution and the water formed in the reaction and the evolved ammonia are removed, thereafter continuing the reaction at a temperature within the range of 240–280° C. and at a reduced pressure of less than about .5 mm. until a poly(ester-amide) having an inherent viscosity of at least .5 is formed and thereafter continuously removing the poly(ester-amide) reaction product from the reaction zone.

13. The process of claim 12 in which the diammonium salt is a salt of a dicarboxylic acid selected from the group consisting of aliphatic dicarboxylic acids containing at least four carbon atoms between the carboxyl groups, aromatic dicarboxylic acids, alkylidenebis(p-phenyleneoxy) diacetic acids, para-phenylenedioxydiacetic acid and 1,4-cyclohexanedicarboxylic acid.

14. The process of claim 12 in which the diammonium salt is a salt of a dicarboxylic acid selected from the group consisting of aliphatic dicarboxylic acids containing at least four carbon atoms between the carboxyl groups, aromatic dicarboxylic acids, alkylidenebis(p-phenyleneoxy) diacetic acids, para-phenylenedioxydiacetic acid and 1,4-cyclohexanedicarboxylic acid and the amino alcohol is an alcohol selected from the group consisting of compounds having the following structural formulae:

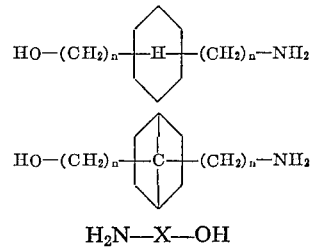

H₂N—X—OH wherein $n=0$ to 4 and X is a straight or branched chain alkylene group containing 4 or more carbon atoms.

15. The process of claim 12 in which the dicarboxylic acid is terephthalic and the aminoalcohol is 4-aminomethylcyclohexanemethanol.

16. The process of claim 12 in which the dicarboxylic acid is trans-1,4-cyclohexanedicarboxylic acid and the aminoalcohol is 4-aminomethylcyclohexanemethanol.

17. The process of claim 12 in which the component of the salt of the dicarboxylic acid consists of 75–95 mole percent terephthalic acid and 25–5 mole percent of another dicarboxylic acid.

References Cited by the Examiner

UNITED STATES PATENTS

| | | | |
|---|---|---|---|
| 2,396,248 | 3/1946 | Christ | 260—78 |
| 2,576,082 | 11/1951 | Tischler et al. | 260—346.3 |
| 3,033,827 | 5/1962 | Kibler et al. | 260—47 |
| 3,053,782 | 9/1962 | Shelby | 260—75 |

OTHER REFERENCES

Fox et al., Science, vol. 124, 1956, page 923.

LEON J. BERCOVITZ, *Primary Examiner.*

R. W. GRIFFIN, *Assistant Examiner.*